United States Patent
Fujita et al.

(10) Patent No.: US 11,535,752 B2
(45) Date of Patent: Dec. 27, 2022

(54) WEATHER-RESISTANT FLAME-RETARDANT RESIN COMPOSITION, OPTICAL FIBER CABLE, AND ELECTRIC WIRE

(71) Applicant: SUMITOMO ELECTRIC INDUSTRIES, LTD., Osaka (JP)

(72) Inventors: Taro Fujita, Osaka (JP); Shinya Nishikawa, Osaka (JP); Nayu Yanagawa, Osaka (JP); Yoshiaki Nagao, Osaka (JP); Masakazu Takami, Osaka (JP); Kenta Tsuchiya, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 373 days.

(21) Appl. No.: 16/648,409

(22) PCT Filed: Sep. 21, 2018

(86) PCT No.: PCT/JP2018/034956
§ 371 (c)(1),
(2) Date: Mar. 18, 2020

(87) PCT Pub. No.: WO2019/065479
PCT Pub. Date: Apr. 4, 2019

(65) Prior Publication Data
US 2020/0277495 A1   Sep. 3, 2020

(30) Foreign Application Priority Data
Sep. 28, 2017   (JP) .............................. JP2017-187498

(51) Int. Cl.
*C08L 85/02*   (2006.01)
*C08K 3/014*   (2018.01)
(Continued)

(52) U.S. Cl.
CPC .............. *C08L 85/02* (2013.01); *C08K 3/014* (2018.01); *C08K 3/22* (2013.01); *C08K 5/17* (2013.01);
(Continued)

(58) Field of Classification Search
CPC .......... C08L 85/02; C08L 23/06; C08L 23/08; C08L 23/20; C08L 83/04; C08L 2201/02;
(Continued)

(56) References Cited

U.S. PATENT DOCUMENTS 7,494,706 B2   2/2009   Chen et al.
2007/0298251 A1*   12/2007   Chen .................. G03G 15/2053
428/447

FOREIGN PATENT DOCUMENTS

EP   1990808   11/2008
JP   H07-224192   8/1995
(Continued)

*Primary Examiner* — Ling Siu Choi
*Assistant Examiner* — Ronald Grinsted
(74) *Attorney, Agent, or Firm* — IPUSA, PLLC

(57) ABSTRACT

A weather-resistant flame-retardant resin composition includes: a polyolefin resin; a mixture of (poly) phosphate compounds, a total content of which is from 10 to 50 parts by mass with respect to 100 parts by mass of the polyolefin resin; 0.1 to 10 parts by mass a non-crosslinked silicone raw rubber having a number-average molecular weight of 10,000 to 1,000,000; and 0.1 to 20 parts by mass of an inorganic UV light shielding agent, and an electric wire and an optical fiber cable whose jacket is formed by the weather-resistant flame-retardant resin.

7 Claims, 1 Drawing Sheet

(51) Int. Cl.
  *C08K 3/22* (2006.01)
  *C08K 5/17* (2006.01)
  *C08K 5/3492* (2006.01)
  *C08L 23/06* (2006.01)
  *C08L 23/08* (2006.01)
  *C08L 23/20* (2006.01)
  *C08L 83/04* (2006.01)
  *H01B 7/295* (2006.01)

(52) U.S. Cl.
  CPC ............ *C08K 5/3492* (2013.01); *C08L 23/06* (2013.01); *C08L 23/08* (2013.01); *C08L 23/20* (2013.01); *C08L 83/04* (2013.01); *H01B 7/295* (2013.01); *C08K 2003/2241* (2013.01); *C08L 2201/02* (2013.01); *C08L 2201/08* (2013.01); *C08L 2203/202* (2013.01); *C08L 2207/062* (2013.01)

(58) Field of Classification Search
  CPC ........... C08L 2201/08; C08L 2203/202; C08L 2207/062; C08K 3/014; C08K 3/22; C08K 5/17; C08K 5/3492; C08K 2003/2241; H01B 7/295
  USPC ........................................................ 252/609
  See application file for complete search history.

(56) References Cited

FOREIGN PATENT DOCUMENTS

| | | |
|---|---|---|
| JP | 2008-063458 | 3/2008 |
| JP | 2008-063558 | 3/2008 |
| JP | 2008-094922 | 4/2008 |
| JP | 2008094922 A * | 4/2008 |
| JP | 2009-541792 | 11/2009 |
| JP | 2010-256467 | 11/2010 |
| JP | 2011-165399 | 8/2011 |
| JP | 2015-093506 | 5/2015 |
| JP | 2015-113413 | 6/2015 |
| JP | 2016-222845 | 12/2016 |

* cited by examiner

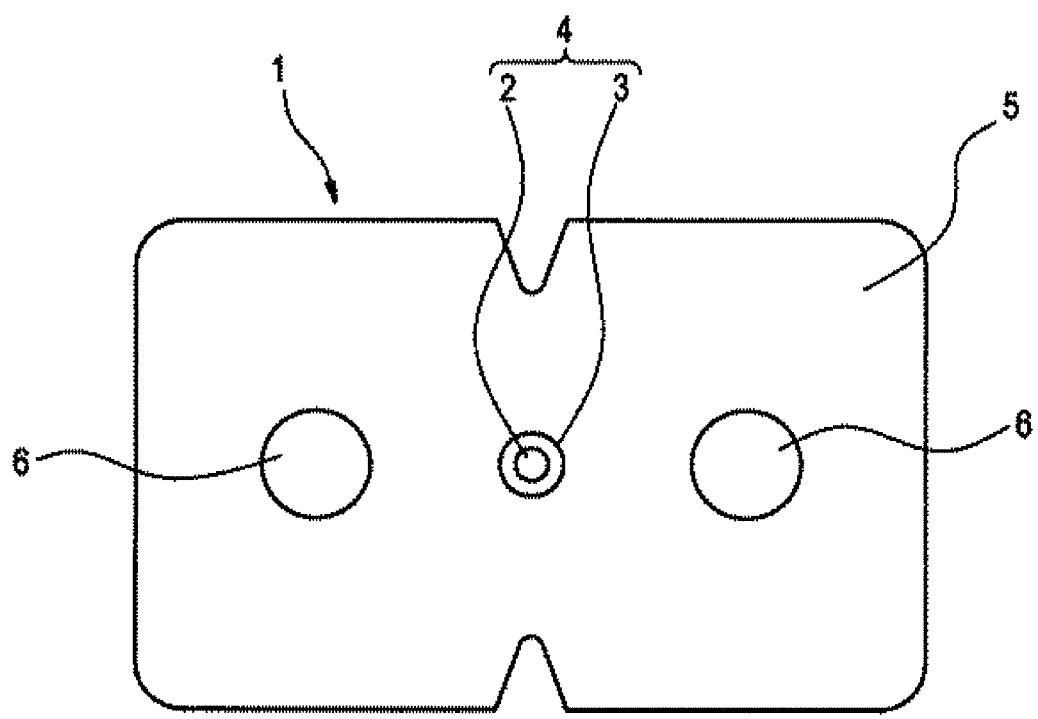

WEATHER-RESISTANT FLAME-RETARDANT RESIN COMPOSITION, OPTICAL FIBER CABLE, AND ELECTRIC WIRE

TECHNICAL FIELD

The present disclosure relates to a weather-resistant flame-retardant resin composition. Also, the present disclosure relates to an optical fiber cable and an electric wire including a jacket formed by the weather-resistant flame-retardant resin composition. This application is based upon and claims priority to Japanese Patent Application No. 2017-187498, filed on Sep. 28, 2017, and the entire contents of the Japanese Patent Application are incorporated herein by reference.

BACKGROUND ART

For apartment houses and buildings where pipes for wiring and common parts for indoor wiring are not provided, a plurality of electric wires, optical fiber cables, and the like that are wired to each one are often bundled and installed along outdoor walls or the like. For jackets (insulation coating or the like) of such electric wires and optical fiber cables that are installed outdoors, in addition to a flame retardancy, a property of not easily being degraded by irradiation with sunlight and outdoor climate variations (weather resistance) is required.

In order to enhance the weather resistance, a black resin composition containing carbon black to absorb UV light is commonly used as a material that forms a jacket and disclosed in Patent Document 1 or the like. However, when a black resin composition is used as a jacket, there are problems that coloring to facilitate identification performed at the time of bundling a plurality of electric wires/optical fiber cables becomes impossible, and wiring to white or pale-colored outer walls of buildings and condominiums is noticeable and impairs the aesthetic appearance. Accordingly, a resin composition that is white or pale in color and that has both an excellent weather resistance and an excellent flame retardancy is desired.

As a method of enhancing the weather resistance without using carbon black, a method of using a light stabilizer such as HALS, an UV light absorber, and a pale-colored light shielding agent such as titanium oxide is known. However, when a large amount of metal hydroxide (such as aluminum hydroxide or magnesium hydroxide) is contained in order to provide a sufficient halogen-free flame retardancy to a jacket, the light stabilizer or the like is adsorbed by the metal hydroxide, and an excellent weather resistance is not obtained.

By jointly using a phosphorus compound such as red phosphorus or a phosphate ester as a flame retardant, the amount of metal hydroxide can be reduced. However, because phosphoric acid generated from the phosphorus compound deactivates HALS, an excellent weather resistance is not obtained. In a case in which red phosphorus is used, further, there is a problem that the resin composition is colored reddish-brown, and free coloring is difficult.

As a resin composition that solves problems as described above and that can provide a jacket that is white or pale in color and that has both an excellent weather resistance and a halogen-free flame retardancy, Patent Document 2 proposes a weather-resistant flame-retardant resin composition containing, at predetermined composition ranges, a polyolefin resin; an intumescent flame retardant that is a mixture of two kinds of (poly) phosphate compounds having specific structures; and a mixture of a light stabilizer and an organic UV light absorber; and an inorganic UV light shielding agent.

PRIOR ART DOCUMENT

Patent Document

[Patent Document 1] Japanese Laid-open Patent Publication No. 2010-256467

[Patent Document 2] Japanese Laid-open Patent Publication No. 2015-113413

SUMMARY OF THE INVENTION

According to a first aspect of the present disclosure, a weather-resistant flame-retardant resin composition includes: a polyolefin resin; a mixture of a first (poly) phosphate compound that is represented by the following general formula (1) and a second (poly) phosphate compound that is represented by the following general formula (3), a total content of which is greater than or equal to 10 parts by mass and less than or equal to 50 parts by mass with respect to 100 parts by mass of the polyolefin resin; 0.1 parts by mass or more and 10 parts by mass or less of a non-crosslinked silicone raw rubber having a number-average molecular weight of 10,000 to 1,000,000; and 0.1 parts by mass or more and 20 parts by mass or less of an inorganic UV light shielding agent.

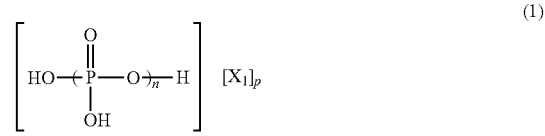

(1)

In the formula (1), n is a number from 1 to 100, $X_1$ is ammonia ($NH_3$) or a triazine derivative that is indicated by the following general formula (2), and p is a number satisfying the relational formula $0 < p \leq n+2$.

(2)

In the formula (2), $Z_1$ and $Z_2$ may be the same or different, and are each independently is a group selected from the group consisting of a group that is represented by $-NR_5R_6$, a hydroxy group, a mercapto group, a linear or branched alkyl group having 1 to 10 carbons, a linear or branched alkoxy group having 1 to 10 carbons, a phenyl group, and a vinyl group. Here, $R_5$ and $R_6$ are each independently a H atom, a linear or branched alkyl group having 1 to 6 carbons, or a methylol group.

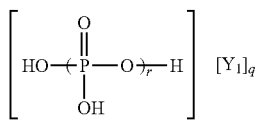

(3)

In the formula (3), r is a number from 1 to 100, $Y_1$ is $[R_1R_2N(CH_2)_mNR_3R_4]$, piperazine, or a diamine containing a piperazine ring. Here, $R_1$, $R_2$, $R_3$, and $R_4$ are each independently a H atom or a liner or branched alkyl group having 1 to 5 carbons, m is an integer from 1 to 10, and q is the number satisfying a relational formula $0<q\leq r+2$.

According to a second aspect of the present disclosure, an optical fiber cable includes an optical fiber and a jacket that is coated on the optical fiber, wherein the jacket is formed by using the weather-resistant flame-retardant resin composition according to the first aspect.

According to a third aspect of the present disclosure, an electric wire includes a conductor and a jacket that is coated on the conductor directly or through another layer, wherein the jacket is formed by using the weather-resistant flame-retardant resin composition according to the first aspect.

BRIEF DESCRIPTION OF THE DRAWINGS

FIG. 1 is a schematic cross-sectional view illustrating an example of an optical fiber cable according to the present disclosure.

EMBODIMENT FOR CARRYING OUT THE INVENTION

Problem to Be Solved by the Present Disclosure

By forming a jacket of an electric wire or an optical fiber cable with a weather-resistant flame-retardant resin composition disclosed in Patent Document 2, it is possible to obtain the electric wire or the optical fiber cable including the jacket that is white or pale in color and that has a weather resistance for sufficiently enabling outdoor wiring/installation and has an excellent halogen-free flame retardancy.

However, a light stabilizer and an organic UV light absorber that are contained in the weather-resistant flame-retardant resin composition are expensive and have a problem of increasing the cost of manufacturing electric wires and optical fiber cables. Also, the light stabilizer and the organic UV light absorber move to the surface of the jacket during storage of electric wires and optical fiber cables, precipitate, and cause a bloom problem. In order to enhance the weather resistance, although a structure containing a light stabilizer and an organic UV light absorber close to the surface of the jacket is preferable, the bloom problem is more noticeable in this structure.

The present disclosure has an object to solve problems as described above. That is, an object is, without containing a light stabilizer and an organic UV light absorber and thus being advantageous in terms of manufacturing cost, to provide a weather-resistant flame-retardant resin composition that can form a jacket of an electric wire or an optical fiber cable that is white or pale in color and that has an excellent weather resistance and an excellent halogen-free flame retardancy without a bloom problem.

Also, the present disclosure has an object to provide an electric wire and an optical fiber cable including a jacket that is white or pale in color and that has an excellent weather resistance and an excellent halogen-free flame retardancy without a bloom problem.

As a result of investigation, the inventors of the present invention have completed the present invention by finding that by using a weather-resistant flame-retardant resin composition containing predetermined contents of a polyolefin resin; an intumescent flame retardant that is a mixture of kinds of (poly) phosphate compounds having specific structures; a non-crosslinked silicone raw rubber having a molecular weight within a predetermined range; and an inorganic UV light shielding agent, a jacket that is white or pale in color and that has an excellent weather resistance and an excellent halogen-free flame retardancy can be formed without a bloom problem.

Effect of the Present Disclosure

According to the first aspect of the present disclosure, a weather-resistant flame-retardant resin composition that is white or pale in color and that has a weather resistance for withstanding outdoor use and has an excellent halogen-free flame retardancy without causing a bloom problem is provided.

According to the second aspect of the present disclosure, an optical fiber cable including a jacket that is white or pale in color and that has a weather resistance for sufficiently enabling outdoor wiring/installation and has an excellent halogen-free flame retardancy without causing a bloom problem is provided.

According to the third aspect of the present disclosure, an electric wire including an electrically insulating jacket that is white or pale in color and that has a weather resistance for sufficiently enabling outdoor wiring/installation and has an excellent halogen-free flame retardancy without causing a bloom problem is provided.

Description of Embodiment of the Present Disclosure

In the following, embodiments for carrying out the first to third aspects will be specifically described. It should be noted that the present invention is not limited to the following embodiments and includes all modifications within the meaning and scope of the claims and equivalents thereof.

First Aspect (Weather-Resistant Flame-Retardant Resin Composition)

According to the first aspect of the present disclosure, a weather-resistant flame-retardant resin composition includes: a polyolefin resin; a mixture of a first (poly) phosphate compound that is represented by the following general formula (1) and a second (poly) phosphate compound that is represented by the following general formula (3), a total content of which is greater than or equal to 10 parts by mass and less than or equal to 50 parts by mass with respect to 100 parts by mass of the polyolefin resin; 0.1 parts by mass or more and 10 parts by mass or less of a non-crosslinked silicone raw rubber having a number-average molecular weight of 10,000 to 1,000,000; and 0.1 parts by mass or more and 20 parts by mass or less of an inorganic UV light shielding agent.

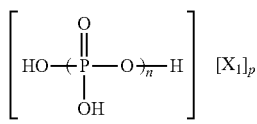

(1)

In the formula (1), n is a number from 1 to 100, $X_1$ is ammonia ($NH_3$) or a triazine derivative that is indicated by the following general formula (2), and p is a number satisfying the relational formula $0 < p \leq n+2$.

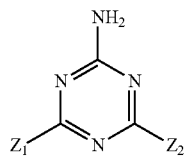

(2)

In the formula (2), $Z_1$ and $Z_2$ may be the same or different, and are each independently is a group selected from the group consisting of a group that is represented by $-NR_5R_6$, a hydroxy group, a mercapto group, a linear or branched alkyl group having 1 to 10 carbons, a linear or branched alkoxy group having 1 to 10 carbons, a phenyl group, and a vinyl group. Here, $R_5$ and $R_6$ are each independently a H atom, a linear or branched alkyl group having 1 to 6 carbons, or a methylol group.

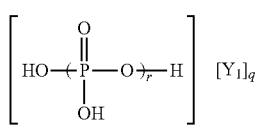

(3)

In the formula (3), r is a number from 1 to 100, $Y_1$ is $[R_1R_2N(CH_2)_mNR_3R_4]$, piperazine, or a diamine containing a piperazine ring. Here, $R_1$, $R_2$, $R_3$, and $R_4$ are each independently a H atom or a liner or branched alkyl group having 1 to 5 carbons, m is an integer from 1 to 10, and q is a number satisfying the relational formula $0 < q \leq r+2$.

(1) Poly-Olefin Resin

Examples of the polyolefin resin that is a constituent of the weather-resistant flame-retardant resin composition according to the first aspect include polyethylene, polypropylene, and the like, and also include a copolymer of ethylene with vinyl acetate, a copolymer with a polar group-containing monomer such as ethyl acrylate, butyl acrylate, or methyl acrylate. Among these, in order to obtain a high resistance to external damages required in a case of outdoor installation, polyethylene that is excellent in mechanical strength is preferable. In particular, one having, as a main component, high density, medium density, or linear low density polyethylene is further preferable. As such polyethylene, a copolymer of ethylene with an α-olefin having about 3 to 20 carbons such as propylene, butene, pentene, hexene, heptene, or octene can also be used. It may be a mixture of the resins described above. As a polyolefin-based resin, it is preferable that the melt flow rate, measured by the method defined in JIS K 7210 (2014), is within the range of 0.1 to 10 g/10 minutes in a case of being measured at a temperature of 190° C. and a load of 2.16 kgf. When being less than 0.1 g/10 minutes, extrusion molding becomes difficult, and when exceeding 10 g/10 minutes, mechanical strength decreases, and practicality as an electric wire and an optical fiber cable tends to decrease.

(2) Flame Retardant

The weather-resistant flame-retardant resin composition according to the first aspect is characterized by using, as a flame retardant of a constituent, two kinds of (poly) phosphate compounds that are represented by the above-described general formulas (1) and (3) in combination.

The (poly) phosphate compound that is represented by the general formula (1) is a salt of (poly) phosphoric acid with ammonia or a triazine derivative that is represented by the general formula (2). The (poly) phosphate compound that is represented by the general formula (3) is a salt of (poly) phosphoric acid with a diamine that is represented by the formula $[R_1R_2N(CH_2)_mNR_3R_4]$, with piperazine, or with a diamine containing a piperazine ring. Each (poly) phosphate compound is a nitrogen-phosphorus flame retardant and is an intumescent flame retardant that exhibits a flame retardant effect by forming a foam thermally-insulating layer at the time of combustion.

Examples of the triazine derivative that is represented by the formula (2) include melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine 2,4-diamino-6-mercapto-1,3,5-triazine, 2-amino-4,6-dimercapto-1,3,5-triazine, and the like.

Also, examples of the diamine that is represented by the formula $[R_1R_2N(CH_2)_mNR_3R_4]$ or the diamine containing a piperazine ring constituting the (poly) phosphate compound that is represented by the general formula (3) include N,N,N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-tetraethylethylenediamine, 1,2-propanediamine, 1,3-propanediamine, tetramethylenediamine, pentamethylenediamine, hexamethylenediamine, 1,7-diaminoheptane, 1,8-diaminooctane 1,9-diaminononane, 1,10-diaminodecan, trans-2,5-dimethylpiperazine, 1,4-bis(2-aminoethyl)piperazine, and 1,4-bis(3-aminopropyl)piperazine.

The mixing ratio of the (poly) phosphate compound that is represented by the general formula (1) and the (poly) phosphate compound that is represented by the general formula (3) is not particularly limited. Examples of the mixture containing kinds of (poly) phosphate compounds include commercially available products such as ADK STAB FP2200S and ADK STAB FP2100J manufactured by ADEKA Corporation.

The average particle diameter of the phosphate compounds that are used in the present disclosure is preferably less than or equal to 10 μm, is more preferably less than or equal to 7 μm, and is further more preferably less than or equal to 5 μm.

The (poly)phosphate compounds that are represented by the general formulas (1) and (3) are chemically stable, with little generation of phosphoric acid.

Further, the (poly) phosphate compounds that are represented by the general formulas (1) and (3) have the following advantages. That is, although there is a problem that a resin composition to which a typical phosphate is added easily discolors when being exposed to a high temperature, the resin composition to which the (poly) phosphate compounds that are represented by the general formulas (1) and (3) are added does not discolor when being exposed to a high temperature. In addition, because the content as a flame retardant can be reduced, it is possible to provide a resin composition and a jacket that have a sufficient rubber elasticity and that are excellent in mechanical properties while suppressing a decrease in permanent elongation and compression set.

The total content of the (poly) phosphate compounds that are represented by the general formulas (1) and (3) is from 10 to 50 parts by mass with respect to 100 parts by mass of the polyolefin resin. The flame retardant exhibits an excellent flame retardant effect, and a sufficient flame retardancy can be obtained by adding a small amount of the flame retardant as in the range described above. Therefore, because it is not necessary to add a large amount of an inorganic compound as a flame retardant, it is possible to prevent problems in a case in which a large amount of metal hydroxide is used as a flame retardant, for example, a decrease in mechanical properties, a decrease in resistance to cold, and the like.

When the content of the above described (poly) phosphate compounds is less than 10 parts by mass, a sufficient flame retardancy may not be obtained. In contrast, in a case of exceeding 50 parts by mass, the mechanical strength and the resistance to cold (low temperature embrittlement test) of the resin composition may decrease. A more preferable range is from 20 parts by mass to 40 parts by mass, and this range enables to more reliably prevent the mechanical strength and the resistance to cold from decreasing and to obtain a sufficient flame retardant effect.

(3) Non-Crosslinked Silicone Raw Rubber

The weather-resistant flame-retardant resin composition according to the first aspect is characterized by containing a predetermined amount of a non-crosslinked silicone raw rubber whose molecular weight is within a predetermined range. According to this feature, an excellent weather resistance for withstanding outdoor use can be obtained. Although, a mixture of a light stabilizer agent and an organic UV light absorber is contained in the weather-resistant flame-retardant resin composition disclosed in Patent Document 2 to obtain an excellent weather resistance, according to the first aspect, by using, instead of these, a non-crosslinked silicone raw rubber having a molecular weight within a predetermined range, an equivalent excellent weather resistance can be achieved.

The mixture of a light stabilizer and an organic UV light absorber contained in a resin composition moves to the surface during storage, precipitates, and causes a bloom problem. However, the non-crosslinked silicone raw rubber does not move to the surface during storage and does not precipitate, and thus does not cause a bloom problem. Even in a case in which the non-crosslinked silicone raw rubber is contained near the surface of the jacket in order to enhance the weather resistance, a bloom problem does not occur. Also, because the non-crosslinked silicone raw rubber is less expensive than a light stabilizer such as HALS (Hindered Amine Light Stabilizer) and an organic UV light absorber, using the non-crosslinked silicone raw rubber instead of these is advantageous in cost.

The non-crosslinked silicone raw rubber, which is a constituent of the resin composition according to the first aspect, is a high molecular compound that is represented by —($R^7R^8$Si—O—)n- (in the formula, $R^7$ and $R^8$ represent a monovalent organic group that is bonded to silicon and n is an integer and represents the number of bonded monomers), and is not substantially crosslinked. Examples of the organic groups represented by $R^7$ and $R^8$ include low molecular weight alkyl groups such as methyl and ethyl, a vinyl group, a phenyl group, and the like. Specific examples of the non-crosslinked silicone raw rubber include, non-crosslinked, silicone raw rubber, silicone oil, silicone varnish, and the like, such as dimethyl silicone, methyl vinyl silicone, and methyl phenyl silicone.

The non-crosslinked silicone raw rubber contained in the resin composition according to the first aspect is a non-crosslinked silicone raw rubber having a number-average molecular weight in the range of 10,000 to 1,000,000. In a case in which the number-average molecular weight is less than 10,000, bleed easily occurs. In contrast, in a case in which the number-average molecular weight is greater than 1,000,000, it becomes difficult to disperse the silicone raw rubber in the base resin, and a decrease in the mechanical properties or the like occurs. Here, the number-average molecular weight is a value measured by gel permeation chromatography (GPC). In a case in which the non-crosslinked silicone raw rubber is dimethyl silicone, the number-average molecular weight is preferably in the range of 50,000 to 700,000, and in particular, dimethyl silicone having a number-average molecular weight in the range of 100,000 to 700,000 and a molecular weight distribution (Mw/Mn) measured by GPC of 5.0 or less is preferably used.

With respect to 100 mass parts of the polyolefin resin, the content of the non-crosslinked silicone raw rubber is greater than or equal to 0.1 parts by mass and less than or equal to 10 parts by mass, and is preferably greater than or equal to 1 part by mass and less than or equal to 8 parts by mass. In a case in which a light stabilizer (HALS) and an organic UV light absorber are not contained, a sufficient weather resistance is not obtained when the content of the non-crosslinked silicone raw rubber is less than 0.1 parts by mass. In contrast, in a case of exceeding 10 parts by mass, a decrease in mechanical properties or the like occurs.

(4) Inorganic UV Light Shielding Agent

The inorganic UV light shielding agent contained in the resin composition according to the first aspect refers to an agent that is inorganic and that has a function (1) to shield UV light or a function (2) to absorb UV light. That is, an inorganic UV light absorber is also included in the inorganic UV light shielding agent. By adding the inorganic UV light shielding agent, degradation of the resin due to irradiation with light is prevented and the weather resistance is further enhanced.

As the inorganic UV light shielding agent, titanium oxide, zinc oxide, or the like may be used, and titanium oxide having a high UV light shielding effect is preferably used. Thus, in the resin composition according to the first aspect, the inorganic UV light shielding agent is preferably titanium oxide.

Also, the content of the inorganic UV light shielding agent is 0.1 to 20 parts by mass with respect to 100 parts by mass of the polyolefin resin. When the content of the inorganic UV light shielding agent is less than 0.1 parts by mass, the weather resistance of the resin composition may be insufficient, and when the content of the inorganic UV light shielding agent exceeds 20 parts by mass, the mechanical strength of the resin composition may decrease, which is not preferable. More preferably, the content of the inorganic UV light shielding agent is greater than or equal to 1 part by mass and less than or equal to 20 parts by mass.

For a composition of the resin composition according to the first aspect, in a case in which, with respect to 100 parts by mass of the polyolefin resin, the total content of the mixture of the first (poly) phosphate compound that is represented by the general formula (1) and the second (poly) phosphate compound that is represented by the general formula (3) is greater than or equal to 20 parts by mass and less than or equal to 40 parts, the content of the non-crosslinked silicone raw rubber having a number-average molecular weight of 10,000 to 1,000,000 is greater than or equal to 1 part by mass and less than or equal to 8 parts, the inorganic UV light shielding agent is titanium oxide of which the content is greater than or equal to 1 part by mass and less than or equal to 20 parts by mass, a further excellent weather resistance can be obtained, and thus it is particularly preferable.

(5) Other Constituent Materials

In addition to the essential constituent materials described above, other additives and resin components can be added to the resin composition according to the first aspect without departing from the spirit of the present aspect. Other additives and resin components include lubricants, thermal stabilizers, antioxidants, antiaging agents, nucleating agents, plasticizers, crosslinking agents, release agents, processing aids, antistatic agents, various fillers, coloring agents, and the like. In addition, a light stabilizer such as a hindered amine light stabilizer (HALS) or an organic UV light absorber as described in Patent Document 2 can be added within a range of not impairing the spirit of the present disclosure, that is, within a range of allowing a bloom problem or an increase in the cost.

(6) Preparation of Resin Composition

The weather-resistant flame-retardant resin composition according to the first aspect can be prepared by mixing the constituent materials described above using a known melt mixer such as a roll mixer, a single-axis kneading extruder, a twin-axis kneading extruder, a pressure kneader, or a Banbury mixer.

(7) Characteristics of Weather-Resistant Flame-Retardant Resin Composition According to the First Aspect The (poly) phosphate compounds, the non-crosslinked silicone raw rubber, and the inorganic UV light shielding agent are each white or pale in color. Accordingly, the weather-resistant flame-retardant resin composition according to the first aspect that contains these as a main component can also be white or pale in color.

Thus, according to the first aspect, the resin composition that is white or pale in color and that has both an excellent weather resistance and an excellent flame-retardancy is provided. Specifically, the weather-resistant flame-retardant resin composition has a weather resistance for sufficiently enabling outdoor use such that the retention ratios of the tensile strength and the tensile elongation are greater than or equal to 70% when being exposed 4000 hours by a sunshine weather meter test that is an index for outdoor use, has an excellent flame retardancy, and is white or pale in color. Also, because each of the constituent materials such as the polyolefin resin, the non-crosslinked silicone raw rubber, the flame retardant, and the inorganic UV light shielding agent is a halogen-free material, the resin composition is adapted to environmental problems in recent years. Moreover, the resin composition according to the first aspect does not cause a bloom problem. It is also cost-effective because it is possible to obtain an excellent weather resistance without using a light stabilizer such as an expensive hindered amine light stabilizer (HALS). For these reasons, it is suitably used to form a jacket of an electric wire and an optical fiber cable.

Second Aspect (Optical Fiber Cable)

According to the second aspect of the present disclosure, an optical fiber cable includes an optical fiber and a jacket that is coated on the optical fiber. In the optical fiber cable, the jacket is foamed by using the weather-resistant flame-retardant resin composition according to the first aspect.

According to the second aspect, because a jacket is formed by using the weather-resistant flame-retardant resin composition according to the first aspect, an optical fiber cable that is white or pale in color and that has a weather resistance sufficient for outdoor installation and has an excellent flame retardancy without causing a bloom problem is provided. This optical fiber cable is excellent in durability because the optical fiber is protected by the jacket from wear and the like over a long period of time.

(1) Configuration of Optical Fiber Cable

The configuration and the like of the optical fiber cable according to the present disclosure are not particularly limited when the weather-resistant flame-retardant resin according to the first aspect is used as a jacket material. FIG. 1 illustrates a schematic cross-sectional view of an optical fiber cable that is an example of one embodiment of the present disclosure. The FIGURE illustrates an optical fiber cable 1, an optical fiber 4, a jacket 5 coated as a jacket material with the weather-resistant flame-retardant resin composition according to the first aspect, and tensile wires (tension members) 6. In the embodiment that is the example of FIG. 1, in parallel with the optical fiber 4, the pair of tensile wires 6 are disposed, and the optical fiber 4 and the tensile wires 6 are integrated by the jacket 5. Also, the optical fiber 4 includes a core portion 2 and a cladding portion (coating layer) 3. For example, quartz to which germanium is added can be used for the core portion 2, and pure quartz or quartz to which fluorine is added can be used for the cladding portion 3. As the tensile wires 6 disposed in parallel with the optical fiber 4, a steel wire or a glass fiber-reinforced plastic (FRP) having an outer diameter of about 0.4 mm, an aramid fiber-reinforced plastic (KFRP), or the like can be used.

(2) Formation of Jacket

The jacket can be formed by extrusion-molding the resin composition according to the first aspect on the optical fiber using a known extrusion-molder such as a melt extruder. For example, in the cross-sectional view (FIG. 1) of the above described optical fiber cable, it is formed with dimensions of 3 mm in the major axis direction and 2 mm in the minor axis direction.

Third Aspect (Electric Wire)

According to the third aspect of the present disclosure, an electric wire includes a conductor and a jacket that is coated on the conductor. In the electric wire, the jacket is formed by using the weather-resistant flame-retardant resin composition according to the first aspect.

According to the third aspect, because a jacket is formed by using the weather-resistant flame-retardant resin composition according to the first aspect, an electric wire that is white or pale in color and that has a weather resistance sufficient for outdoor installation and has an excellent flame retardancy without causing a bloom problem is provided. This electric wire is excellent in durability because the conductor is protected by the electrically-insulating jacket from corrosion and the like over a long period of time.

(1) Conductor

Examples of the conductor constituting the electric wire according to the third aspect include copper, aluminum, and the like having that are excellent in conductivity. The conductor may be a single wire, or a plurality of stranded element wires.

(2) Formation of Jacket

The jacket can be formed by extrusion-molding the weather-resistant flame-retardant resin composition according to the first aspect on the conductor wire using a known extrusion-molder such as a melt extruder, similarly to the case of the optical fiber cable. The thickness of the jacket is determined as suited in accordance with the size, the use, and the like of the electric wire.

EXAMPLES

[1] Preparation of Resin Composition

1. Used Materials
(1) Polyolefin-Based Resin
High-density polyethylene: HI-ZEX 5305E (manufactured by Mitsui Chemicals, Inc.)
Linear medium-density polyethylene: NOVATEC LL UE320 (manufactured by Japan polyethylene Corporation)
Ethylene-butene copolymer: TAFMER DF610 (manufactured by Mitsui Chemicals, Inc.)
Ethylene-octene copolymer: ENGAGE 8150 (manufactured by The Dow Chemical Company)
(2) Flame Retardant
Intumescent flame retardant: ADK STAB FP2200S (manufactured by ADEKA Corporation)
Intumescent flame retardant: ADK STAB FP2100J (manufactured by ADEKA Corporation)
Magnesium hydroxide: MAGSEEDS V6F (manufactured by Konoshima Chemical Co., Ltd.)
Phosphate ester: PX-200 (manufactured by DAIHACHI CHEMICAL INDUSTRY CO., LTD.)
Red phosphorus: HISHIGUARD LP-E (manufactured by Nippon Chemical Industrial Co., Ltd.)

It should be noted that the intumescent flame retardant is a mixture of the first (poly) phosphate compound that is represented by the general formula (1) and the second (poly) phosphate compound that is represented by the general formula (3).

(3) Antioxidant: Irganox 1010 (Manufactured by BASF SE)
(4) Non-Crosslinked Silicone Raw Rubber
Dimethyl silicone: TSE200 (manufactured by Momentive Performance Materials Inc.)
Weight-average molecular weight (Mw) 664,000
Number-average molecular weight (Mn) 388,000
Molecular weight distribution (Mw/Mn) 1.7
(5) Inorganic UV Light Shielding Agent
Titanium oxide: GTR-100 (manufactured by Sakai Chemical Industry Co., Ltd.)
(6) Light Stabilizer
HALS: CHIMASSORB 119FL (manufactured by BASF SE)
(7) Organic UV Light Absorber
UV light absorber: TINUVIN 328 (manufactured by BASF SE)
Stearic acid (lubricant): STEARIN (manufactured by NOF CORPORATION)

2. Preparation of Pellets

The above described materials were mixed at respective contents (unit: parts by mass) indicated in Table 1 to Table 4, kneaded at a temperature of 160° C. using a roll mixer, and then pellets of the resin compositions were prepared using a granulator.

TABLE 1

|  |  | Example 1 | Example 2 | Example 3 | Example 4 | Example 5 |
| --- | --- | --- | --- | --- | --- | --- |
| POLYOLEFIN RESIN | HI-ZEX 5305E | 50 | 50 | 50 | 50 | 50 |
|  | NOVATEC LL UE320 | 30 | 30 | 30 | 30 | 30 |
|  | TAFMER DF610 | 20 | 20 | 20 | — | 10 |
|  | ENGAGE 8150 | — | — | — | 20 | — |
| FLAME RETARDANT | ADK STAB FP2200S | 30 | 30 | 30 | 30 | 30 |
|  | ADK STAB FP2100J | — | — | — | — | — |
|  | MAGSEEDS V6F | — | — | — | — | — |
|  | PX-200 | — | — | — | — | — |
|  | HISHIGUARD LP-E | — | — | — | — | — |
| ANTIOXIDANT | Irganox 1010 | 2 | 2 | 2 | 2 | 2 |
| DIMETHYL SILICONE | TSE200 | 2 | 2 | 2 | 0.2 | 8 |
| STEARIC ACID |  | — | — | — | — | — |
| HALS | CHIMASSORB 119FL | — | — | — | — | — |
| UV LIGHT ABSORBER | TINUVIN 328 | — | — | — | — | — |
| TITANIUM OXIDE | GTR-100 | 0.2 | 2 | 18 | 2 | 2 |
| TOTAL |  | 134.2 | 136 | 152 | 134.2 | 132 |

TABLE 2

|  |  | Example 6 | Example 7 | Example 8 |
|---|---|---|---|---|
| POLYOLEFIN RESIN | HI-ZEX 5305E | 50 | 50 | 50 |
|  | NOVATEC LL UE320 | 30 | 30 | 30 |
|  | TAFMER DF610 | 20 | 20 | 20 |
|  | ENGAGE 8150 | — | — | — |
| FLAME RETARDANT | ADK STAB FP2200S | — | 10 | 50 |
|  | ADK STAB FP2100J | 30 | — | — |
|  | MAGSEEDS V6F | — | — | — |
|  | PX-200 | — | — | — |
|  | HISHIGUARD LP-E | — | — | — |
| ANTIOXIDANT | Irganox 1010 | 2 | 2 | 2 |
| DIMETHYL SILICONE | TSE200 | 2 | 2 | 2 |
| STEARIC ACID |  | — | — | — |
| HALS | CHIMASSORB 119FL | — | — | — |
| UV LIGHT ABSORBER | TINUVIN 328 | — | — | — |
| TITANIUM OXIDE | GTR-100 | 2 | 2 | 2 |
| TOTAL |  | 136 | 116 | 156 |

TABLE 3

|  |  | Example 9 | Example 10 | Example 11 | Example 12 | Example 13 |
|---|---|---|---|---|---|---|
| POLYOLEFIN RESIN | HI-ZEX 5305E | 50 | 50 | 50 | 50 | 50 |
|  | NOVATEC LL UE320 | 30 | 30 | 30 | 30 | 30 |
|  | TAFMER DF610 | 20 | 20 | 20 | 20 | 20 |
|  | ENGAGE 8150 | — | — | — | — | — |
| FLAME RETARDANT | ADK STAB FP2200S | 8 | 55 | 30 | 30 | 30 |
|  | ADK STAB FP2100J | — | — | — | — | — |
|  | MAGSEEDS V6F | — | — | — | — | — |
|  | PX-200 | — | — | — | — | — |
|  | HISHIGUARD LP-E | — | — | — | — | — |
| ANTIOXIDANT | Irganox 1010 | 2 | 2 | 2 | 2 | 2 |
| DIMETHYL SILICONE | TSE200 | 2 | 2 | 2 | — | — |
| STEARIC ACID |  | — | — | — | — | 2 |
| HALS | CHIMASSORB 119FL | — | — | 2 | 2 | 2 |
| UV LIGHT ABSORBER | TINUVIN 328 | — | — | 2 | 2 | 2 |
| TITANIUM OXIDE | GTR-100 | 2 | 2 | 2 | 2 | 2 |
| TOTAL |  | 114 | 161 | 140 | 138 | 140 |

TABLE 4

|  |  | Example 14 | Example 15 | Example 16 | Example 17 | Example 18 | Example 19 |
|---|---|---|---|---|---|---|---|
| POLYOLEFIN RESIN | HI-ZEX 5305E | 50 | 50 | 50 | 50 | 50 | 50 |
|  | NOVATEC LL UE320 | 30 | 30 | 30 | 30 | 30 | 30 |
|  | TAFMER DF610 | 20 | 20 | 20 | 20 | 20 | 20 |
|  | ENGAGE 8150 | — | — | — | — | — | — |
| FLAME RETARDANT | ADK STAB FP2200S | 30 | 30 | — | — | — | — |
|  | ADK STAB FP2100J | — | — | — | — | — | — |
|  | MAGSEEDS V6F | — | — | 50 | 50 | 50 | 50 |
|  | PX-200 | — | — | — | 10 | — | — |
|  | HISHIGUARD LP-E | — | — | — | — | 1 | 1 |
| ANTIOXIDANT | Irganox 1010 | 2 | 2 | 2 | 2 | 2 | 2 |
| DIMETHYL SILICONE | TSE200 | — | — | 0.5 | 0.5 | 0.5 | 12 |
| STEARIC ACID |  | 2 | — | — | — | — | — |
| HALS | CHIMASSORB 119FL | — |  |  |  |  |  |

TABLE 4-continued

|  |  | Example 14 | Example 15 | Example 16 | Example 17 | Example 18 | Example 19 |
|---|---|---|---|---|---|---|---|
| UV LIGHT ABSORBER | TINUVIN 328 | — | — | — | — | — | — |
| TITANIUM OXIDE | GTR-100 | 2 | 2 | 5 | 5 | 5 | 5 |
| TOTAL | | 136 | 134 | 157.5 | 167.5 | 158.5 | 170 |

3. Preparation of Resin-Coated Electric Wires

The pellets of the resin compositions obtained in "2. Preparation of Pellets" described above were extruded at a thickness of 0.5 mm on a conductor of TA 7/0.254 using a 50 mmφ extruder to prepare resin-coated electric wires with an insulating outer diameter of 1.762 mmφ.

4. Evaluation of Resin-Coated Electric Wires (1) Evaluation Method

The resin-coated electric wires obtained in "3. Preparation of Resin-Coated Electric Wires" described above were evaluated by the following evaluation method.

a. Tensile Testing

The jacket (coating resin), obtained by drawing the conductor from the resin-coated electric wire, was pulled at 200 mm/min according to the method specified in JIS C3005 (2014), and the tensile strength and the tensile elongation were measured. Then, it was determined as acceptable when the tensile strength ≥10 MPa and the tensile elongation ≥150%.

b. JIS 60° Inclining Combustion Test

Based on JIS C3005 (2014), a 60° inclining combustion test was conducted. Specifically, using a Bunsen burner having a diameter of 10 mm, the length of the flame is adjusted to about 130 mm and the length of the reducing flame is adjusted to about 35 mm. The resin-coated electric wire is then supported and inclined at 60° with respect to the horizontal direction, and the tip of the reducing flame is placed about 20 mm from the bottom of the sample until the resin-coated electric wire burns within 30 seconds. After removing the flame gently, the degree of combustion of the sample is checked. When the flame spontaneously disappeared within 60 seconds, it was determined as acceptable, and when the time to disappear exceeded 60 seconds, it was determined as unacceptable.

C. Sunshine Weather Meter Test

Whether to pass a sunshine weather meter test that is generally an index for outdoor use was set as the determination criteria of acceptance/unacceptance. Specifically, after exposure for 4000 hours under conditions of a black panel temperature of 63° C. and water spray at 12 minutes/60 minutes, the tensile testing was conducted to measure the tensile strength and tensile elongation to determine the ratios with respect to the tensile strength and the tensile elongation before the test (retention ratios). It is acceptable when the retention ratios of both the tensile strength and the tensile elongation are ≥70%.

d. Low Temperature Embrittlement Test

From the pellet used to prepare the resin-coated electric wire, a sheet of 2 mm thick was prepared by a thermal press machine, and a test piece with a length of 38 mm and a width of 6 mm was prepared based on JIS C3005 (2014). The test piece was set in a low temperature embrittlement tester, the test temperature was adjusted to −30° C., and the test piece was attached to a gripper and immersed in a medium for 2.5 minutes. Thereafter, the temperature was recorded, a blow was applied, and the presence/absence of cracks was visually checked. Then, it was determined as acceptable when no cracks occurred.

3. Bloom Test

With respect to the appearance of the electric wires after storage of the resin-coated electric wires at 40° C. for one month, the presence/absence of bloom was determined visually. It was determined as acceptable when no bloom was seen and it was determined as unacceptable when a bloom was visible.

(2) Evaluation Results

The evaluation results are indicated by Tables 5 to 8.

TABLE 5

|  |  | Example 1 | Example 2 | Example 3 | Example 4 | Example 5 |
|---|---|---|---|---|---|---|
| TENSILE STRENGTH (Mpa) | | 15.6 | 13.8 | 11.2 | 14.2 | 10.4 |
| TENSILE ELONGATION (%) | | 400 | 320 | 170 | 410 | 240 |
| JIS 60° INCLINING COMBUSTION TEST | | ACCEPTABLE | ACCEPTABLE | ACCEPTABLE | ACCEPTABLE | ACCEPTABLE |
| SUNSHINE WEATHER METER TEST | TENSILE STRENGTH RETENTION RATIO % | 72 | 89 | 91 | 75 | 87 |
| | TENSILE ELONGATION RETENTION RATIO % | 73 | 95 | 100 | 71 | 99 |
| LOW TEMPERATURE EMBRITTLEMENT TEST | | ACCEPTABLE | ACCEPTABLE | ACCEPTABLE | ACCEPTABLE | ACCEPTABLE |
| BLOOM TEST | | ACCEPTABLE | ACCEPTABLE | ACCEPTABLE | ACCEPTABLE | ACCEPTABLE |

TABLE 6

|  | Example 6 | Example 7 | Example 8 |
|---|---|---|---|
| TENSILE STRENGTH (Mpa) | 13.2 | 16.1 | 10.5 |
| TENSILE ELONGATION (%) | 350 | 640 | 170 |
| JIS 60° INCLINING COMBUSTION TEST | ACCEPTABLE | ACCEPTABLE | ACCEPTABLE |
| SUNSHINE WEATHER METER TEST — TENSILE STRENGTH RETENTION RATIO % | 90 | 99 | 85 |
| SUNSHINE WEATHER METER TEST — TENSILE ELONGATION RETENTION RATIO % | 97 | 102 | 90 |
| LOW TEMPERATURE EMBRITTLEMENT TEST | ACCEPTABLE | ACCEPTABLE | ACCEPTABLE |
| BLOOM TEST | ACCEPTABLE | ACCEPTABLE | ACCEPTABLE |

TABLE 7

|  | Example 9 | Example 10 | Example 11 | Example 12 | Example 13 |
|---|---|---|---|---|---|
| TENSILE STRENGTH (Mpa) | 16.5 | 9.6 | 13.4 | 13.9 | 13.0 |
| TENSILE ELONGATION (%) | 700 | 130 | 260 | 240 | 240 |
| JIS 60° INCLINING COMBUSTION TEST | UNACCEPTABLE | ACCEPTABLE | ACCEPTABLE | ACCEPTABLE | ACCEPTABLE |
| SUNSHINE WEATHER METER TEST — TENSILE STRENGTH RETENTION RATIO % | 100 | 87 | 100 | 86 | 82 |
| SUNSHINE WEATHER METER TEST — TENSILE ELONGATION RETENTION RATIO % | 95 | 90 | 97 | 83 | 85 |
| LOW TEMPERATURE EMBRITTLEMENT TEST | ACCEPTABLE | UNACCEPTABLE | ACCEPTABLE | ACCEPTABLE | ACCEPTABLE |
| BLOOM TEST | ACCEPTABLE | ACCEPTABLE | UNACCEPTABLE | UNACCEPTABLE | UNACCEPTABLE |

TABLE 8

|  | Example 14 | Example 15 | Example 16 | Example 17 | Example 18 | Example 19 |
|---|---|---|---|---|---|---|
| TENSILE STRENGTH (Mpa) | 14.5 | 14.2 | 14.8 | 11.8 | 12.5 | 9.1 |
| TENSILE ELONGATION (%) | 290 | 330 | 200 | 190 | 230 | 160 |
| JIS 60° INCLINING COMBUSTION TEST | ACCEPTABLE | ACCEPTABLE | UNACCEPTABLE | ACCEPTABLE | ACCEPTABLE | ACCEPTABLE |
| SUNSHINE WEATHER METER TEST — TENSILE STRENGTH RETENTION RATIO % | 68 | 65 | 76 | 35 | 45 | 100 |
| SUNSHINE WEATHER METER TEST — TENSILE ELONGATION RETENTION RATIO % | 66 | 67 | 80 | 20 | 30 | 102 |
| LOW TEMPERATURE EMBRITTLEMENT TEST | ACCEPTABLE | ACCEPTABLE | ACCEPTABLE | ACCEPTABLE | ACCEPTABLE | ACCEPTABLE |
| BLOOM TEST | ACCEPTABLE | ACCEPTABLE | ACCEPTABLE | ACCEPTABLE | ACCEPTABLE | ACCEPTABLE | from 0.1 parts by mass to 20 parts by mass, the test results of the tensile strength, the tensile elongation, the JIS 60° inclining combustion test, the sunshine weather meter test, the low temperature embrittlement test, and the bloom test all pass the determination criteria of acceptance/unacceptance.

Among these, for each of Examples 2 to 3 and 5 to 8 in which, with respect to 100 parts by mass of the polyolefin resin, the total content of the intumescent flame retardant is greater than or equal to 20 parts by mass and less than or equal to 40 parts by mass, the content of dimethyl silicone is greater than or equal to 1 part by mass and less than or equal to 8 parts by mass, and the content of titanium oxide is greater than or equal to 1 part by mass and less than or equal to 20 parts by mass, the retention ratio of the tensile strength is greater than or equal to 85% and the retention ratio of the tensile elongation is greater than or equal to 90% in the sunshine weather meter test and a particularly excellent weather resistance is obtained, and thus it is indicated as particularly preferable.

Table 5 to Table 8 indicate that, for each of Examples 1 to 8 where the resin composition satisfies requirements of the first aspect as the jacket in which, with respect to 100 parts by mass of the polyolefin resin, the total content of the mixture (intumescent flame retardant) of the first (poly) phosphate compound that is represented by the general formula (1) and the second (poly) phosphate compound that is represented by the general formula (3) is from 10 parts by mass to 50 parts by mass, the content of dimethyl silicone is from 0.1 parts by mass to 10 parts by mass, and the content of the inorganic UV light shielding agent (titanium oxide) is In contrast, Example 9 in which the content of the intumescent flame retardant is 8 parts by mass, which is less than 10 parts by mass, is unacceptable in the JIS 60° inclining combustion test, and Example 10 in which the content of the intumescent flame retardant is 55 parts by mass, which exceeds 50 parts by mass, has a low tensile strength and is unacceptable in the low temperature embrittlement test. Also, in Examples 14 and 15 that does not contain dimethyl silicone and does not contain a light stabilizer (HALS) and an organic UV light absorber, the retention ratio of the tensile strength and the retention ratio of the tensile elongation are both less than 70% in the sunshine weather meter test, and a sufficient weather resistance is not obtained. Example 14, which contains two parts by mass of stearic acid that is known to be used as a lubricant similar to dimethyl silicone, has a weather resistance equivalent to that of Example 15, and does not indicate enhancement of weather resistance by containing of stearic acid.

Example 11 contains a light stabilizer (HALS) and an organic UV light absorber together with dimethyl silicone and Examples 12 to 13 contain a light stabilizer (HALS) and an organic UV light absorber instead of dimethyl silicone, each of which has an excellent weather resistance but is unacceptable in the bloom test. The results indicate that containing a light stabilizer (HALS) and an organic UV light absorber causes a bloom problem. In Example 19, in which the content of dimethyl silicone is 12 parts by mass that exceeds 10 parts by mass, the tensile strength is less than 10 MPa and the mechanical properties decrease.

Also, Example 16, which contains 50 parts by mass of magnesium hydroxide without using an intumescent flame retardant as a flame retardant, is unacceptable in the JIS 60° inclining combustion test and is insufficient in the flame retardancy. Examples 17, which contains 50 parts by mass of magnesium hydroxide without using an intumescent flame retardant as a flame retardant and further contains 10 parts by mass of phosphate ester and Example 18, which further contains 1 part by mass of red phosphorus, are acceptable in the JIS 60° inclining combustion test but are unacceptable in the sunshine weather meter test and indicate that a sufficient weather resistance is not obtained.

The above results indicate that, by containing, with respect to 100 parts by mass of a polyolefin resin, 10 to 50 parts by mass of an intumescent flame retardant with a specific structure, 0.1 to 10 parts by mass of a non-crosslinked silicone raw rubber having a number-average molecular weight of 10,000 to 1,000,000, and 0.1 to 20 parts by mass of an inorganic UV light shielding agent, the mechanical strength represented by the tensile strength and the tensile elongation, the flame retardancy, and the weather resistance can be balanced at a high level and a bloom problem can be suppressed.

DESCRIPTION OF THE REFERENCE NUMERALS

1 Optical fiber cable
2 Core portion
3 Cladding part
4 Optical fiber
5 Jacket
6 Tensile wire

The invention claimed is:

1. A jacket having a one-layer coating structure that is coated on a conductor or an optical fiber, the jacket comprising:
a resin composition consisting of:
a polyolefin resin;
a mixture of a first (poly) phosphate compound that is represented by a general formula (1) and a second (poly) phosphate compound that is represented by a general formula (3), a total content of which is greater than or equal to 10 parts by mass and less than or equal to 50 parts by mass with respect to 100 parts by mass of the polyolefin resin;
0.1 parts by mass or more and 10 parts by mass or less of a non-crosslinked silicone raw rubber having a number-average molecular weight of 10,000 to 1,000,000; and
0.1 parts by mass or more and 20 parts by mass or less of an inorganic UV light shielding agent,
wherein the formula (1) is:

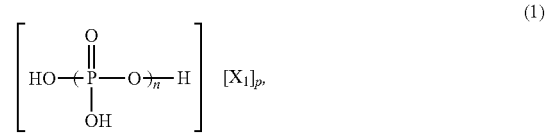

where n is a number from 1 to 100, $X_1$ is $NH_3$ or a triazine derivative that is indicated by a general formula (2), and p is a number satisfying a relational formula $0<p \leq n+2$, wherein the formula (2) is:

where $Z_1$ and $Z_2$ may be the same or different, and are each independently is a group selected from the group consisting of a group that is represented by $—NR_5R_6$, a hydroxy group, a mercapto group, a linear or branched alkyl group having 1 to 10 carbons, a linear or branched alkoxy group having 1 to 10 carbons, a phenyl group, and a vinyl group, wherein $R_5$ and $R_6$ are each independently a H atom, a linear or branched alkyl group having 1 to 6 carbons, or a methylol group, and wherein the formula (3) is:

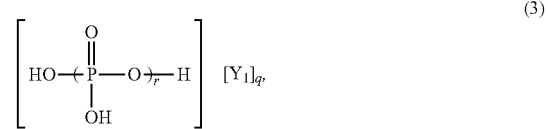

where r is a number from 1 to 100, $Y_1$ is $[R_1R_2N(CH_2)_m NR_3R_4]$, piperazine, or a diamine containing a piperazine ring, wherein $R_1$, $R_2$, $R_3$, and $R_4$ are each independently a H atom or a linear or branched alkyl group having 1 to 5 carbons, m is an integer from 1 to 10, and q is a number satisfying a relational formula $0<q \leq r+2$.

2. The jacket according to claim 1, wherein the inorganic UV light shielding agent is titanium oxide.

3. The jacket according to claim 2, wherein with respect to 100 parts by mass of the polyolefin resin, the total content of the mixture of the first (poly) phosphate compound that is represented by the general formula (1) and the second (poly) phosphate compound that is represented by the general formula (3) is greater than or equal to 20 parts by mass and less than or equal to 40 parts, the content of the non-crosslinked silicone raw rubber having a number-average molecular weight of 10,000 to 1,000,000 is greater than or equal to 1 part by mass and less than or equal to 8 parts, and the content of the titanium oxide is greater than or equal to 1 part by mass and less than or equal to 20 parts by mass.

4. An optical fiber cable including an optical fiber and a jacket that is coated on the optical fiber, wherein the jacket is of claim 1.

5. An electric wire including a conductor and a jacket that is coated on the conductor directly,
wherein the jacket is of claim 1.

6. The jacket according to claim 1, wherein magnesium hydroxide is not contained.

7. A weather-resistant flame-retardant resin composition that is directly coated on a conductor or an optical fiber, the resin composition comprising:
a polyolefin resin;
a mixture of a first (poly) phosphate compound that is represented by a general formula (1) and a second (poly) phosphate compound that is represented by a general formula (3), a total content of which is greater than or equal to 10 parts by mass and less than or equal to 50 parts by mass with respect to 100 parts by mass of the polyolefin resin;
0.1 parts by mass or more and 10 parts by mass or less of a non-crosslinked silicone raw rubber having a number-average molecular weight of 10,000 to 1,000,000; and
0.1 parts by mass or more and 20 parts by mass or less of an inorganic UV light shielding agent,
wherein the formula (1) is:

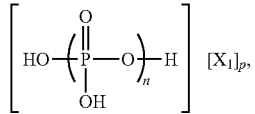  (1)

where n is a number from 1 to 100, $X_1$ is $NH_3$ or a triazine derivative that is indicated by a general formula (2), and p is a number satisfying a relational formula $0<p \leq n+2$, wherein the formula (2) is:

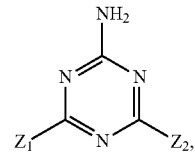  (2)

where $Z_1$ and $Z_2$ may be the same or different, and are each independently is a group selected from the group consisting of a group that is represented by $—NR_5R_6$, a hydroxy group, a mercapto group, a linear or branched alkyl group having 1 to 10 carbons, a linear or branched alkoxy group having 1 to 10 carbons, a phenyl group, and a vinyl group, wherein $R_5$ and $R_6$ are each independently a H atom, a linear or branched alkyl group having 1 to 6 carbons, or a methylol group, and
wherein the formula (3) is:

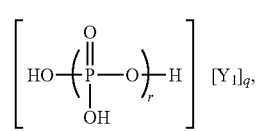  (3)

where r is a number from 1 to 100, $Y_1$ is $[R_1R_2N(CH_2)_m NR_3R_4]$, piperazine, or a diamine containing a piperazine ring, wherein $R_1$, $R_2$, $R_3$, and $R_4$ are each independently a H atom or a linear liner or branched alkyl group having 1 to 5 carbons, m is an integer from 1 to 10, and q is a number satisfying a relational formula $0<q \leq r+2$.

* * * * *